April 21, 1953
H. A. TOULMIN, JR
METHOD AND APPARATUS FOR PRODUCING
STAPLE GLASS FIBERS
Filed June 3, 1950
2,635,285
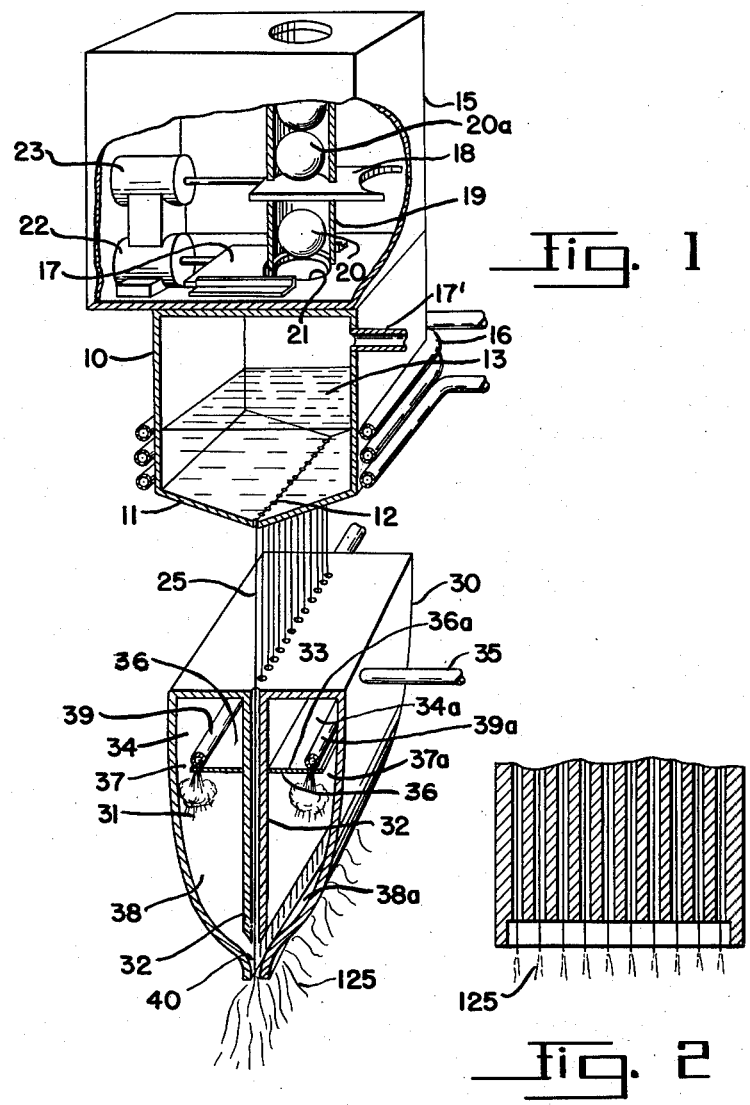
INVENTOR
HARRY A. TOULMIN JR
BY
Toulmin & Toulmin.
ATTORNEYS Patented Apr. 21, 1953

2,635,285

UNITED STATES PATENT OFFICE 2,635,285

METHOD AND APPARATUS FOR PRODUCING STAPLE GLASS FIBERS

Harry A. Toulmin, Jr., Dayton, Ohio, assignor to Glass Fibers, Inc., Waterville, Ohio, a corporation of Ohio Application June 3, 1950, Serial No. 165,965

4 Claims. (Cl. 18—2.5)

This invention relates to methods and apparatus for producing staple glass filaments, and particularly to an improved method and apparatus by which the production of staple filaments is greatly increased.

In the known methods of producing staple glass filaments, a body of glass is heated to a molten condition in a suitable melting chamber that is provided with a series of small openings in the bottom wall of the chamber. Molten glass issues through the small openings in small streams that are engaged by jets of high pressure gas directed angularly upon opposite sides of the streams of molten glass to greatly increase the speed of forward advancement of the streams and thereby cause attenuation of the streams into fine filaments. The pressure of the gas jets, or the angular positioning of the jets is such that the filaments are broken into staple length either at the jets or below the jets.

The staple glass filaments are collected on suitable carriers whereby mats or bats of staple glass filaments can be produced.

Since, as a practical matter, the size of the openings in the melting chamber through which the molten glass issues in glass streams is limited as to smallness because of friction of flow of glass through the openings at the operating viscosity and since the degree of attenuation of the molten stream that is effected by the engagement of the high pressure gas jets with the molten streams is limited by the degree of speed increase that can be given to the molten streams, there results a practical limit to the rate of production of staple length glass filaments that can be produced in any given apparatus.

It is therefore an object of this invention to provide a method and apparatus by which staple length glass filaments can be produced in increased quantities of commercially known diameters of the filaments.

It is another object of the invention to provide a method and apparatus for producing staple length glass filaments in which small glass fibers or strands are extruded from a melting chamber for delivery in a continuous process into a second heating chamber in which the so produced glass fibers or strands are re-heated and subsequently drawn into staple length filaments.

In carrying forward the purposes of this invention, it is another object of the invention to provide a method and apparatus for producing staple length glass filaments in which a body of molten glass is placed under relatively high pressure to cause extrusion of the molten glass through a plurality of small openings by which small diameter glass fibers are produced, and thereafter re-heat the glass fibers so produced in a heating chamber utilizing principles of the thermal jet engine to obtain high temperatures for re-heating the glass fibers or strands and utilize the expansion of the gases developed to produce high pressure high velocity streams of gas that engage the re-heated fibers or strands to attenuate them into fine filaments and concurrently break up the filaments so produced into staple length filaments.

Further objects and advantages will become apparent from the drawings and the following description.

In the drawings:

Figure 1 is a diagrammatic perspective view of apparatus for accomplishing the purposes of this invention.

Figure 2 is a vertical cross-sectional view through the glass fiber passage of the re-heating apparatus.

In this invention a body of glass is heated within a heating chamber to molten condition. The heating chamber is provided with a plurality of small openings in one wall, preferably the bottom wall, through which the molten glass within the chamber will be extruded by the application of pressure within the chamber upon the body of molten glass. The molten glass will issue from the openings in the heating chamber in small streams which will cool quickly as the streams leave the heating chamber to form small glass fibers or glass strands.

The openings in the heating chamber are sufficiently small that the glass streams issuing through the openings will be referred to in this description as fibers or strands. As the glass strands leave the openings in the heating chamber for the molten glass, the temperature of the strands falls rapidly. Thus, a very short distance from the discharge side of the openings, the strands are of a solid nature, even though at this time they are still of a relatively high temperature and thus retain substantially the same diameter as that of the opening.

The solidified glass fibers or strands are then conducted into a second high temperature heating zone of sufficient intensity to cause the strands to be re-heated to within a temperature range at which they can be drawn and attenuated into fine glass filaments, the term filament identifying the drawn and attenuated strand. Since the glass strands or fibers are of very small diameter, the high temperature of the re-heating zone will produce rapid temperature increase of the strands so that they can pass through the zone at a high speed. As the glass strands or fibers leave the high temperature re-heating zone, each strand or fiber enters a burner throat wherein it is engaged by high pressure high velocity gas that is directed angularly at opposite sides of the fiber or strand with the gas flowing in the direction of movement of the strands. The high pressure gas thus frictionally engages the strand or fiber to increase the speed of forward movement of the strand in the burner throat and therebeyond in the direction of its length to a value much greater than that at which the strands are extruded from the body of molten glass, thus causing the strand in the area in which it is reheated to draw out and attenuate into a fine glass filament.

Further, a gas turbulence is created around the glass filament as it leaves the nozzle or burner throat opening whereby the filaments are broken into staple filaments.

In producing the glass fibers or strands from the body of molten glass in the primary heating or melting chamber, the openings through which the glass is extruded may be on the order of .010" to .015". The glass will extrude from the openings at substantially this same diameter when pressure of from 5# to 10# per square inch is applied upon the body of molten glass within the melting or heating chamber with the glass heated to a temperature of from 2300° F. to 2400° F.

The amount of pressure applied upon the body of molten glass in the heating and melting chamber is regulated to cause extrusion of the glass fibers or strands at a rate just equal to that at which they can be heated in the secondary re-heating zone to attenuation temperature of from 1800° F. to about 2100° F. The gas blasts engaging the strand below the re-heating zone in the throat of the heating burner will increase the rate of movement of the filament to a speed much greater than that at which the strand enters the re-heating zone, thus drawing the strand into a fine filament in the order of .0001" to .0015" in diameter.

In the secondary melting chamber or burner high temperature is produced by combustion of a suitable fuel, such as combustible hydro-carbons, which combustion produces gases that discharge from the secondary heating chamber through an opening or throat in which the filaments produced by the primary heating chamber are engaged by the high pressure high velocity gases discharging through the opening to cause drawing of the strand into a fine filament, and breaking of the strand into staple length fiber.

In Figure 1 there is illustrated an apparatus for carrying forward the purposes and method of this invention. The apparatus consists of a heating or melting chamber 10 that has a bottom wall 11 provided with a plurality of small openings 12 arranged in a row across the bottom wall 11. The chamber 10 contains a body of molten glass 13 that is periodically replenished by a feeding mechanism 15.

The body of glass 13 is maintained in a molten condition by a heating coil 16 that surrounds the lower portion of the heating chamber 10. This heating coil 16 is preferably an electric induction coil, or a high frequency heating coil connected with suitable electric equipment or high frequency generating equipment for inducing electric energy into the coil 16 to maintain the body of glass 13 at a melting temperature of from 2300° F. to 2400° F.

The body of molten glass 11 is placed under a gaseous pressure that is delivered into the chamber 10 through a conduit 17' to cause the molten glass 13 to extrude through the openings 12.

The extrusion of molten glass through the openings 12 produces a glass fiber or strand that is substantially of the same diameter as the opening 12.

The feeding mechanism 15 for maintaining the supply of molten glass 13 at a relatively constant level consists of a pair of cooperating slide valves 17 and 18 that are spaced from one another and are adapted to alternately close a feeding tube 19 through which glass marbles 20 are fed into the chamber 10 through the feed opening 21. The slide valves 17 and 18 are operated in opposite directions by means of electric solenoids 22 and 23 respectively.

With the slide valves 17 and 18 in the position illustrated in Figure 1, the glass marble numbered 20 is released for dropping through the feed opening 21 into the chamber 10. The valve 18 closes off the feed tube 19 to prevent escape of gaseous pressure from within the heating chamber 10. After the marble 20 has dropped into the chamber 10, the solenoids 22 and 23 will be operated to reverse the position of the slide valves 17 and 18 so that the valve 17 then closes off the tube 19 while the valve 18 aligns the recess 24 with the tube 19 to permit the glass marble 20a to drop upon the slide valve 17 ready for another feed drop into the chamber 10 upon reverse movement of the valves. Operation of the valves 17 and 18 thus provides a gas pressure trap to permit feeding of the glass marbles 20 without losing pressure from within the heating chamber 10. Thus, the body of molten glass 13 will always be under a substantially uniform degree of gaseous pressure as fed through the conduits 17' and as controlled by suitable pressure control devices.

The glass fibers or strands 25 that are extruded through the openings 12 cool rapidly upon leaving the heating chamber 10 so that at a short distance below the bottom wall 11 of the heating chamber 10 the fibers or strands 25 are solidified, even though their temperature is still relatively high, between 1000° F. to 1200° F.

The glass fibers or strands 25 are moved in the direction of their length at a uniform rate of speed by their extrusion from the chamber 10 in accordance with the value of the pressure that is applied upon the body of molten glass 13 in the chamber 10, thus providing a series of solidified glass fibers or strands arranged in a parallel row, or a common plane, which are fed as solidified fibers or strands into a second heating and attenuating apparatus 30 wherein the glass fibers or strands are re-heated to an attenuation temperature of from 1800° F. to 2100° F. so that the fibers or strands can be drawn in the direction of their length to attenuate the strands into fine glass filaments.

The heating and attenuating apparatus 30 consists of a closed pressure chamber 31 having an intermediate wall 32 that is provided with a series of longitudinally extending bores 33 into which the individual glass fibers or strands 25 are introduced and from which attenuated glass filaments 125 are discharged as staple.

The closed heating chamber 31 has the two compartments 34 and 34a interconnected across the ends of the chambers so that high pressure air delivered into the chamber 34a through the conduit 35 will also be delivered into the chamber 34.

The chambers 34 and 34a each have a horizontal partition wall 36 and 36a respectively which is secured to the intermediate wall 32 along one edge of the partition wall and has the opposite edge spaced from the wall of the chamber 31 to form passages 37 and 37a through which air under pressure is delivered into the lower compartments 38 and 38a of the chamber 31.

The air delivered into the compartments 38 and 38a is heated and expanded by the combustion of a fuel delivered into compartments 38 and 38a through the conduits 39 and 39a. The fuel used is preferably a liquid hydro-carbon which is introduced into the chamber under high pressure to spray the fuel into the compartments 38 and 38a for admixture with the air delivered thereinto to form a combustible mixture which upon burning greatly expands the air to develop exceedingly high pressure within the chambers 38 and 38a and produces a high temperature within the chambers 38 and 38a which heats the intermediate partition wall 32.

The delivery of air and fuel into the chambers 38 and 38a follows the principle of a thermal jet engine, and particularly a thermal jet engine of the ram type wherein large volumes of air are rammed into the chambers 38 and 38a into which combustible hydro-carbons are sprayed and burned to increase the temperature and pressure of the air for exhausting through an elongated opening 40 that receives gases from the chambers 38 and 38a below the lower edges of the partition wall 32.

By utilizing the principle of a thermal jet engine, high gaseous pressure and a high temperature is created which is used to quickly re-heat the glass fibers or strands as they are introduced into the heating and attenuating apparatus 30 and to attenuate the strands into fine glass fibers. Temperature on the order of 2000° F. or more is created in the chamber 31 by the combustion of the fuel, depending on the nature of the fuel used, so that the glass fiber or strand introduced into the openings 31 is re-heated by conduction and radiation from the wall 32 in the heating zone immediately below the partition walls 36 and 36a, whereby to elevate the temperature of the glass strand to approximately 1800° F.

The nozzle opening 40 in the bottom edge of the chambers 38 and 38a receives the glass strands 25 so that the gases passing through the opening 40 will engage the strands 25 for attenuation of them in their re-heated zone. Also, since the opening 40 is fully elongated to receive all of the strands 25, the gases leaving the opening will create a turbulence at the discharge end of the opening whereby the drawn filaments will be broken up into staple length glass filaments by the turbulence of the gases at and below the discharge end of the nozzle opening 40.

Since the glass fibers or strands that enter the heating and attenuating apparatus 30 are of small diameter, they are heated quickly by the high temperature of the heating apparatus 30 to their attenuating temperatures so that rapid introduction of the glass fibers or strands into the heating and attenuating apparatus is possible. Thus, a greatly increased quantity of continuous length glass filament is obtained.

The size of the glass filaments 125 produced in the apparatus illustrated in Figure 1 depends largely on the diameter of the openings 12 in the primary heating chamber 10 and the degree of attenuation that can be given to the glass fibers or strands 25 by the velocity of the gas that flows through the opening 40 in the secondary heating and attenuating apparatus in relation to the primary diameter of the fibers or strands 25. That is, for a given velocity of gas discharging through the opening 40 there is a determined value of increased speed that can be given to the filaments 125. Thus, when the fibers or strands 25 enter the openings 33 at a diameter of .030" to .035", attenuation of the strands or fibers will produce a filament 125 of from .0002" to .0003", which are normally accepted commercial diameters of continuous length filaments that are utilized in the manufacture of glass thread and yarn.

As the diameter of the openings 12 is reduced to commercially accepted small size such as .010" to .015", the glass filaments 125 that are produced from glass fibers or strands extruded at the smaller diameters will be exceedingly smaller in their diameter than those produced from the fibers or strands extruded from the larger size openings in the heating chamber 10, in the latter instance the diameter of the filaments 125 being reduced to as much as one-tenth that of the afore-mentioned commercial type of filaments.

The staple length glass filaments discharging below the opening 40 in the secondary heating and attenuating apparatus can be collected upon any suitable carrier in any suitable thickness to produce mats or bats of commercial variety.

While the method and apparatus disclosed and described herein constitutes a preferred arrangement of the invention, yet it will be understood that alterations are possible without departing from the spirit of the invention, and that all modifications that fall within the scope of the appended claims are intended to be included herein.

Having thus fully described my invention, what I claim as new and desire to secure by Letters Patent is:

1. Apparatus for producing staple glass filaments that consists of, a first heating chamber having a plurality of small openings in one wall thereof, heating means for said chamber to maintain glass therein in a molten condition, means for conducting gaseous pressure to within said chamber applied on the body of molten glass in said chamber for extrusion thereof through said openings, a second heating chamber operatively associated with said first heating chamber, said second heating chamber including a combustion chamber converging to an elongated nozzle opening through which gases from said combustion chamber are exhausted, said combustion chamber further including an internal heating wall extending longitudinally along said elongated nozzle opening and having passage means spaced longitudinally therealong through which glass strands are directed, said heating wall terminating adjacent said nozzle opening but spaced inwardly thereof whereby to provide an elongated space at each side of said wall through which combustion gases discharge, said wall also having the opening means in the said wall in linear alignment with said nozzle opening, means for conducting a gas under pressure into said combustion chamber, and means for conducting a fuel into said combustion chamber for combustion therein whereby to heat said combustion chamber and expand the gas therein for discharge through said nozzle opening at high pressure and high velocity.

2. The method of producing staple glass filaments, comprising, flowing glass strands from a molten body of glass, effecting cooling of the strands to the extent of rendering the strands solid, reheating to attenuation temperature a substantial length of the advancing ends of the strands, and thereafter applying a high temperature high velocity turbulent gas blast directly against the advancing outer ends of the reheated strands in the direction of advancement of the strands whereby the strands are attenuated and broken up into fine filaments by the force of the blast.

3. The method of producing staple glass filaments, comprising, applying pressure to a body of molten glass with consequent extrusion of the glass by the said pressure into continuously flowing glass strands, effecting cooling of the strands to the extent of rendering the strands solid, reheating to attenuation temperature a substantial length of the advancing ends of the strands, and thereafter applying directly against the advancing outer ends of the strands a high temperature high velocity turbulent gas blast moving in the direction of advancement of the strands whereby to attenuate the strands to break the strands into fine filaments by the force of the blast.

4. The method of producing staple glass filaments, comprising, extruding glass strands from a molten body of glass, effecting cooling of the strands to the extent of rendering the strands solid, subjecting the advancing ends of the strands to the heating effect of high temperature combustible gases to heat the advancing ends of the strands to attenuation temperature, and immediately thereafter applying a high velocity turbulent blast of gas at high temperature directly against the reheated advancing ends of the strands in advance of the portion thereof undergoing reheating and in the direction of advancement of the strands whereby to attenuate the strands breaking the strands into fine filaments by the force of the blast.

HARRY A. TOULMIN, Jr.

References Cited in the file of this patent

UNITED STATES PATENTS

| Number | Name | Date |
|---|---|---|
| 2,175,225 | Slayter | Oct. 10, 1939 |
| 2,294,266 | Barnard | Aug. 25, 1942 |
| 2,489,242 | Slayter et al. | Nov. 22, 1949 |
| 2,571,025 | Fletcher | Oct. 9, 1951 |